United States Patent Office 2,911,316
Patented Nov. 3, 1959

2,911,316

GLYCERIDE OIL GEL PAINTS

Jacobus Rinse, Bernardsville, N.J., assignor to J. W. Ayers & Co., Easton, Pa., a corporation of Delaware No Drawing. Application March 9, 1956
Serial No. 570,414

11 Claims. (Cl. 106—253)

This invention relates to glyceride oil gel coating compositions and more particularly to dripless or so-called gel paints and their preparation from drying oils i.e., those classified either as "drying oils" or as "semi-drying oils," by reaction with certain aluminum acylates or alkoxides hereinafter defined.

In my copending application Serial No. 439,473, filed June 25, 1954, I have disclosed that alkoxy aluminum acylates may be reacted with mono- or di-glycerides of higher molecular fatty acids to produce stable coating compositions which will thicken and harden rapidly when applied in film form.

The dripless paints proposed in the literature or sold to the trade only partially satisfy the demands as to quality or availability, for they are either costly to produce or they are lacking in water resistance, brushing, flowing or drying properties.

An object of the present invention is to provide superior dripless paint at an acceptably low cost. Another object is to produce such paints using inert pigments which will dry at a satisfactorily rapid rate without requiring the addition of excessive amounts of the usual metal driers or drying pigments which would lessen the life of the paint film.

Broadly considered, the process of the invention may be defined as involving the production of paint and varnish bases by gelling a hydroxylated glyceride drying oil through reaction of the same with a small amount of an aluminum compound compatible with the oil, and having the basic formula:

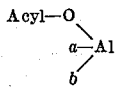

wherein $a$ and $b$ may be acyloxy radicals, may be hydrocarbon-oxy radicals, may be an oxo= radical together, and wherein $a$ may be an hydroxy radical provided $b$ is a hydrocarbon-oxy radical.

When the compound reacted with the glyceride oil is an oxo-aluminum acylate or its polymer, the primary product formed appears to be an addition product in which the oxygen of the glyceryl hydroxy group attaches to the aluminum atom, and the hydrogen atom of said group attaches to the "oxo" oxygen atom. The reaction of the other types of aluminum compounds with the hydroxylated glyceride oil may be exemplified by the reaction of hydroxy, alkoxy aluminum acylate involving the introduction of the fatty acid glyceryl radical into the aluminum compound molecule and the liberation of alcohol. The primary reaction product appears to have the formula:

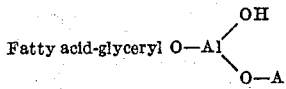

The glyceride oil containing free hydroxy groups may be either one of two types. The first type may be defined as vegetable or animal oils which are commonly defined as "bodied oils" and may be produced by heating the oil to a temperature around 300° C. until the viscosity has been increased to at least ten poises at 25° C. and preferably to 50–200 poises. Through this heating, mono- and diglycerides are formed by splitting, thus providing the required free hydroxy groups. Examples of such oils are soybean, linseed and safflower oils.

The second type of hydroxylated oils utilizable in the process may be referred to as partial esters produced by heating drying oils, either the regular grade or the heat-bodied grade with a polyol until the combination reaction has taken place (the so-called alcoholysis process) whereby free or reactive hydroxy groups are provided in the oil products produced. Though any polyol can be employed, those with higher functionality are preferred for they promote more rapid drying. Examples are glycerol, sorbitol, mannitol and particularly, pentaerythritol. Epoxy resins containing free epoxy groups can also be used, and especially those produced from bis-phenol and epichlorohydrine. The quantity of the polyol or epoxy resin usable with the oil varies between about 1–20% but usually 2–6%, by weight, is sufficient.

The aluminum compounds utilizable in the practice of the present invention include hydroxy, alkoxy aluminum acylates and the corresponding phenoxy compounds; mono-alkoxy aluminum diacylates; dialkoxy aluminum monoacylates and as well the corresponding phenoxy compounds of all of these alkoxy aluminum acylate compounds; true aluminum triacylates, and oxo-aluminum acylates.

In addition to the above monomers, the copolymers and mixed polymers producible from certain of the above aluminum compounds are also operable in the practice of the present invention. Such polymers may be obtained from the hydroxy alkoxy aluminum acylates simply by heating, as to 80° C. or more, and from the dialkoxy aluminum monoacylates and oxo-aluminum acylates by heating them to such temperatures in the presence of an equivalent amount of water (with the oxo compound no water is required), glycol or other polyol, hydroxy carboxylic acid or dicarboxylic acid. Examples of such polymers are diacyloxy, aluminum-oxy-aluminum diacylate and H[O—Al(—X)—]$_n$OR wherein X is an acyloxy group and R is a hydrocarbon group.

Processes of preparing the aluminum compounds used in the composition of the present invention do not constitute any part of the present invention, for they are described in part in the prior art and in part in applicant's prior copending applications. Examples of and details as to preparation of the oxo-aluminum acylates and the polymers thereof are disclosed in applicant's prior application Serial No. 533,235 filed September 8, 1955.

The hereinbefore mentioned compounds require one or more radicals of a length which impart the required oil compatibility. With this limitation, the acylate and hydrocarbon radicals may be of any length from one carbon atom up, although radicals of at least three carbon atoms are preferred. The acylate radicals may be of any structure including normal and branched, and saturated and unsaturated, the preferred acids being fatty acids of higher molecular weight such as octoic, oleic and stearic acids.

The hydrocarbon radicals of the hydrocarbon-oxy groups contained in the aluminum compounds may be cyclic or acyclic, saturated or unsaturated, straight or branched, and may contain any number of carbon atoms from one up, with the limitation that there must be at least one radical or combination of radicals of sufficient chain length to impart the required solubility with the oil to be reacted therewith.

Among the preferred alkoxy groups are the lower molecular alkyl radicals of both the normal and iso structure, as those containing 3 to 6 carbon atoms. Among the cyclic groups, there may be mentioned the benzyl radical, the phenyl radical and the cyclohexyl radical.

The acylate, alcoholate and phenolate radicals of the aluminum compounds may be substituted and be derived from dicarboxylic acids, glycols, glycolic acids or from compounds which have been substituted at a carbon atom or atoms by any other atoms or radicals which do not interfere with the required activity of the aluminum compounds, as those containing nitrogen or oxygen, as in ether and ester substituent groups or those containing hydrocarbon radicals as in butyl- and amyl-phenyl radicals. Where the terms "alkoxy" and "phenoxy" are employed herein they are used broadly to include not only the unsubstituted radicals but also those which are substituted with non-interfering atoms or radicals.

The reaction of the glyceride oils with the aluminum compounds can be accomplished by heating the mixtures of said ingredients, either by themselves or in hydrocarbon solution as in mineral spirits, turpentine or an aromatic solvent as xylene, at elevated temperatures suitably between about 100° and 250° C. until gelling takes place or until no further change in viscosity occurs, the time usually required varying between about 10 and 60 minutes. In connection with the gels produced to date, the preferred conditions involve heating at 160° to 170° C. for from 15 minutes or more.

The time required for completion of gelation in any particular reaction may be determined by test, for the treatment is complete when the gel of the desired consistency is obtained or when no further increase in viscosity or gel strength is observed. The preferred reaction procedure involves mixing and heating the oil and the aluminum compound together in the presence of little or no solvent until the gelation reaction is completed and then adding the mineral spirits or other hydrocarbon after the gel has been cooled. If a specific use is anticipated for the gel, it can be diluted while hot with an appropriate hydrocarbon solvent or paint thinner compatible with the gelled oil. The diluted glyceride oil gel is then ready for sale to, or use by, compounders of the protective coating compositions herein described.

Through this heat treatment a strong chemical combination of the reactants is obtained, and as a result, the coating compositions employing such oils possess a high resistance against the action of moisture or water.

To determine what time of heating is required to provide gels completely stable to hydrolysis, samples of the reaction product in a test run may be checked from time to time by adding a few drops of water to 20 grams of the same, heating the mixture to a temperature between 100° and 150° C. until all water is boiled off, cooling the mass, then replacing any hydrocarbon solvent evaporated during the heating and testing the strength of the gel. If no loss in gel strength is observed, then the product is hydrolysis stable, for hydrolyzable gels thin down and weaken if they react with water.

If the paint manufacturer prefers to grind his pigments in non-gelled vehicles, he may use the alcoholized oil and after grinding he can then add the aluminum compound, to obtain a gelled paint, which in many respects will be comparable to the gel paints made by the first method.

The quantity of aluminum compound required to effect gelation of the glyceride oils depends upon the nature of the specific compounds employed and upon other factors, but ordinarily from 0.5 up to 10% is sufficient, depending upon many factors, including the desired degree of softness or stiffness required in the gel to be produced. In any particular formulation, proper thixotropic gel properties can be obtained only if the components are carefully proportioned within fairly narrow limits.

In producing the coating composition of the present invention, pigments, extenders, resins, thinners, driers and other conventional paint materials can be added either before or after the gel-forming reaction has been carried out, depending upon the activity of the gelling agent and the desired properties in the gel paint. If the active additions are made before the grinding operation is carried out, then a heat treatment to produce superior gels is no longer possible. When the gelling is delayed to the end of the paint production process, the procedure has an advantage in that the oils are liquid during compounding and thus are easily handled. It is surprising, however, that when the oils are gelled with the aid of heat in the initial step, the jelly-like product may be compounded with the pigment and other ingredients without appreciable difficulty, for the gels possess excellent wetting properties for pigments.

An important embodiment of the invention follows from the discovery that paints can be successfully produced using inert (i.e. zinc and lead free) pigments exclusively, as titanium dioxide, lead titanate and carbon black. No zinc or lead pigments are required to provide adequately fast drying. Paint compositions of high pigment volume concentrations of 50% or even as high as 60 or 70% can be prepared under the practice of the invention and yet excellent flow properties retained.

Whether they contain active pigments (as zinc oxide and white lead) or not the paint compositions of the present invention dry rapidly from the action of the aluminum compound therein, but normaly the addition of the regular paint driers is desirable or needed, examples being lead, cobalt and other metal resinates, naphthenates and oleates, but smaller quantities are required than are needed in the absence of the aluminum compound addition.

The thixotropic qualities of the paints of the present invention prevent settling of pigments and facilitate spreading with the brush without any hindrance to the flowing qualities of the paint. The quantity of aluminum is so small in the coating that this metal exercises no harmful influence on the lasting flexibility of the coatings or on its durability. Beside the improved rheological properties of the paint, the drying properties are improved and the paint penetrates less into porous surfaces to which it is applied.

The invention is illustrated by the following examples, wherein the amounts given are parts by weight.

Example 1

One hundred parts of bodied linseed oil of $Z_6$ viscosity and AV 25 are heated to 160° C. in a kettle whereupon 3% of hydroxy isopropoxy aluminum stearate solution in mineral spirits (67%) is added and heated for one hour at 160–190° C. The resulting gel is poured out of the kettle, and it stiffens somewhat on cooling. For producing paint therefrom one hundred parts of the gelled oil are mixed with one hundred parts of mineral spirits, 150 parts of rutile titanium dioxide and 2 parts of cobalt naphthenate. An excellent thixotropic non-penetrating paint is thereby obtained.

Example 2

One hundred parts of linseed oil are mixed with 6 parts of bis-phenol-epichlorhydrin resin (Epon 1001) and heated at 300° C. during stirring until a homogeneous mass is obtained. The resulting mixture is then heated to 150° C. and 6 parts of polymerized oxo-aluminum oleate dissolved in 6 parts of mineral spirits are added and stirred into the mass. The temperature of the resulting mixture is raised to 180° C. and heated for 30 minutes until a stiff gel is obtained.

The thus obtained gelled linseed oil is then dissolved in an equal amount of mineral spirits. Thereupon 40 parts of the resulting solution are mixed with 40 parts of titanium-calcium sulfate pigment (Titanox RCHT) and the resulting mixture is then ground, thinned with 10 parts of mineral spirits and 0.5 part of lead-cobalt naphthenate or other conventional drier. A thixotropic paint having good flowing properties is thereby obtained.

*Example 3*

One hundred parts of oiticica oil is mixed with 5 parts of hydroxy phenoxy aluminum oleate and heated at 200° C. until a thickened mass has been obtained. Thereupon the mass is thinned by the addition of 100 parts of mineral spirits and as a result a strong gel is obtained. Next the gel is mixed and ground with rutile titanium dioxide in the ratio of 1 part gel, 1 part pigment and 1 part mineral spirits. The resulting product is a rapidly drying paint. (Oiticica oil under the conditions of the reaction with the aluminum compounds produces the required hydroxyl groups, for such oil contains the group, —$CH_2CO$— which is capable of enolyzing into the group, —$CH=C(OH)$—.)

*Example 4*

Ten parts of carbon black are ground in 60 parts of linseed oil which has theretofore been alcoholized by reaction with 1.5 parts of sorbitol. Thereupon the conventional drier and 6% of aluminum di-isopropylate, monoethylglycolate are added and the mass is vigorously stirred.

It should be understod that the present invention is not limited to the details herein described but that it extends to all equivalent materials, conditions and procedures which will occur to those skilled in the art upon consideration of the scope of the claims appeneded hereto.

I claim:

1. A thixotropic gel coating composition containing the gelatinous reaction product of an hydroxylated glyceride drying oil and an aluminum compound compatible with said oil selected from the group consisting of those compounds defined by the basic formula:

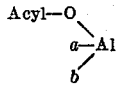

wherein *a* and *b* respectively are selected from the group consisting of acyloxy and acyloxy, acyloxy and hydrocarbonoxy, hydrocarbonoxy and hydrocarbonoxy, hydrocarbonoxy and hydroxy, and an oxo= radical together.

2. The gel defined in claim 1 wherein the oil used is a bodied drying oil containing free hydroxy groups.

3. The gel defined in claim 1 wherein the oil used is a partial ester of a drying oil with a polyol of at least three hydroxy groups.

4. The gel defined in claim 1 wherein the oil component is oiticica oil.

5. Thixotropic gel paints having a pigment content consisting of inert pigments, and containing the gelatinous reaction product of an hydroxylated glyceride drying oil and an aluminum compound compatible with said oil selected from the group consisting of those compounds defined by the basic formula:

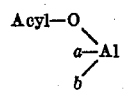

wherein *a* and *b* respectively are selected from the group consisting of acyloxy and acyloxy, acyloxy and hydrocarbonoxy, hydrocarbonoxy and hydrocarbonoxy, hydrocarbonoxy and hydroxy, and an oxo= radical together.

6. A titanium dioxide pigmented thixotropic gel paint containing the gelatinous reaction product of an hydroxylated glyceride drying oil and an aluminum compound compatible with said oil selected from the group consisting of those compounds defined by the basic formula:

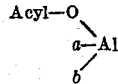

wherein *a* and *b* respectively are selected from the group consisting of acyloxy and acyloxy, acyloxy and hydrocarbonoxy, hydrocarbonoxy and hydrocarbonoxy, hydrocarbonoxy and hydroxy, and an oxo= radical together.

7. The gel defined in claim 1 wherein the aluminum compound used is an alkoxy hydroxy aluminum acylate.

8. The gel defined in claim 1 wherein the aluminum compound used is an oxo-aluminum acylate.

9. A process for producing thixotropic gel paints which comprises forming a homogeneous mixture of a gelatinous reaction product of an hydroxylated glyceride drying oil and an aluminum compound compatible with said oil selected from the group consisting of those compounds defined by the basic formula:

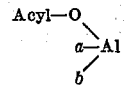

wherein *a* and *b* respectively are selected from the group consisting of acyloxy and acyloxy, acyloxy and hydrocarbonoxy, hydrocarbonoxy and hydrocarbonoxy, hydrocarbonoxy and hydroxy, and an oxo= radical together, with pigment, thinner and drier, said gelatinous reaction product having been obtained by reacting said glyceride oil with from 0.5–10% of the said aluminum compound at a temperature above about 100° C.

10. A process for producing thixotropic gel paints, which comprises, heating and reacting at a temperature above about 100° C. an hydroxylated glyceride drying oil and from 0.5–10% thereof of an aluminum compound compatible with said oil selected from the group consisting of those compounds defined by the basic formula:

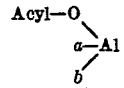

wherein *a* and *b* respectively are selected from the group consisting of acyloxy and acyloxy, acyloxy and hydrocarbonoxy, hydrocarbonoxy and hydrocarbonoxy, hydrocarbonoxy and hydroxy, and an oxo= radical together, and forming a homogeneous mixture of the gelatinous reaction product obtained with pigment, thinner and drier.

11. The process defined in claim 10 wherein the reaction between the oil and the aluminum compound is effected by heating to a temperature of from 100° to 250° C. until the reaction is complete.

References Cited in the file of this patent

UNITED STATES PATENTS

| | | |
|---|---|---|
| 2,464,202 | Rust | Mar. 15, 1949 |
| 2,469,041 | Jones | May 3, 1949 |
| 2,582,833 | Hunn | Jan. 15, 1952 |
| 2,599,553 | Hotten | June 10, 1952 |
| 2,736,666 | Beacham | Feb. 28, 1956 |
| 2,752,262 | Dunlap | June 26, 1956 |
| 2,803,609 | Schlenker | Aug. 20, 1957 |